United States Patent
Rentschler et al.

(10) Patent No.: US 11,190,393 B2
(45) Date of Patent: Nov. 30, 2021

(54) WIRELESS IO-LINK COMMUNICATION NETWORK HAVING AN ADDITIONAL MASTER AND METHOD FOR ITS OPERATION

(71) Applicant: Balluff GmbH, Neuhausen (DE)

(72) Inventors: Markus Rentschler, Dettingen (DE); Matthias Beyer, Metzingen (DE); Pascal Gaggero, Sutz (CH); Simon Mahler, Suberg (CH)

(73) Assignee: Balluff GmbH, Neuhausen (DE)

( * ) Notice: Subject to any disclaimer, the term of this patent is extended or adjusted under 35 U.S.C. 154(b) by 0 days.

(21) Appl. No.: 16/260,376

(22) Filed: Jan. 29, 2019

(65) Prior Publication Data

US 2019/0238397 A1  Aug. 1, 2019

(30) Foreign Application Priority Data

Jan. 30, 2018  (DE) ..................... 10 2018 102 067.8

(51) Int. Cl.
*H04L 12/24* (2006.01)
*H04L 12/26* (2006.01)
(Continued)

(52) U.S. Cl.
CPC ......... *H04L 41/0668* (2013.01); *H04B 10/03* (2013.01); *H04B 10/0795* (2013.01);
(Continued)

(58) Field of Classification Search
CPC ........... H04L 2012/6443; H04L 12/437; H04L 41/0654; H04L 45/28; H04L 41/0668;
(Continued)

(56) References Cited

U.S. PATENT DOCUMENTS 6,434,612 B1 * 8/2002 Hughes ................. H04L 49/255
709/223
6,944,681 B1 * 9/2005 Christensen .......... H04L 12/403
710/17
(Continued)

FOREIGN PATENT DOCUMENTS

| DE | 10 2012 009 494 A1 | 11/2013 |
| DE | 20 2015 1 03 359 U1 | 7/2015 |
| DE | 10 2016 217 706 A1 | 3/2017 |

OTHER PUBLICATIONS

IEC 61131-9, Edition 1.0, Sep. 2013, "Programmable controllers—Part 9: Single-drop digital communication interface for small sensors and actuators (SDCI)," total of 576 pages.
(Continued)

*Primary Examiner* — Omer S Mian

(74) *Attorney, Agent, or Firm* — Collard & Roe, P.C.

(57) ABSTRACT

A wireless IO-link communication network has a main master and at least one device which have a bidirectional wireless communication between the main master and the at least one device, as well as a backup master which is connected to the main master and the at least one device and is configured to control the at least one device. In a method for operating the IOLW communication network with such a backup master, the backup master controls the at least one device instead of the main master.

20 Claims, 3 Drawing Sheets

(51) Int. Cl.
*H04B 10/03* (2013.01)
*H04B 10/079* (2013.01)

(52) U.S. Cl.
CPC ...... *H04L 41/0663* (2013.01); *H04L 41/0681* (2013.01); *H04L 43/0811* (2013.01)

(58) Field of Classification Search
CPC .......... H04Q 2213/13145; H04B 10/03; H04B 10/112; H04B 10/114
See application file for complete search history.

(56) References Cited

U.S. PATENT DOCUMENTS

| | | | |
|---|---|---|---|
| 10,127,163 B2 | 11/2018 | Feinaeugle | |
| 2002/0010750 A1* | 1/2002 | Baretzki | G06F 11/0745 709/208 |
| 2002/0044549 A1* | 4/2002 | Johansson | H04L 45/46 370/386 |
| 2007/0002773 A1* | 1/2007 | Wang | H04L 12/422 370/258 |
| 2008/0216156 A1* | 9/2008 | Kosaka | G07C 9/27 726/4 |
| 2011/0066750 A1* | 3/2011 | Cochard | H04W 40/12 709/232 |
| 2013/0007319 A1* | 1/2013 | Decker | G06F 11/2005 710/110 |
| 2014/0297903 A1* | 10/2014 | Cox | H04L 69/162 710/36 |
| 2015/0121507 A1* | 4/2015 | Haija | G06F 21/44 726/17 |
| 2018/0323998 A1* | 11/2018 | Sawa | H04L 12/403 |

OTHER PUBLICATIONS

ISO 15745-1, First edition, Mar. 1, 2003, "Industrial automation systems and integration—Open systems application integration framework—Part 1: Generic reference description," total of 40 pages.
ISO 15745-1 Amendment 1, Apr. 1, 2007, "Industrial automation systems and integration—Open systems application integration framework—Part 1: Generic reference description—Amendment 1," total of 16 pages.
ISO 15745-2, First Edition, Nov. 15, 2003, "Industrial automation systems and integration—Open systems application integration framework—Part 2: Reference description for ISO 11898-based control systems," total of 170 pages.
ISO 15745-3, First Edition, Nov. 15, 2003, "Industrial automation systems and integration—Open systems application integration framework—Part 3: Reference description for IEC 61158-based control systems," total of 276 pages.
ISO 15745-4, First Edition, Nov. 15, 2003, "Industrial automation systems and integration—Open systems application integration framework—Part 4: Reference description for Ethernet-based control systems," total of 132 pages.
ISO 15745-4 Amendment 1, Feb. 15, 2006, "Industrial automation systems and integration—Open systems application integration framework—Part 4: Reference description for Ethernet-based control systems—Amendment 1: PROFINET profiles," total of 56 pages.
ISO 15745-4 Amendment 2, Feb. 1, 2007, "Industrial automation systems and integration—Open systems application integration framework—Part 4: Reference description for Ethernet-based control systems—Amendment 2: Profiles for Modbus TCP, EtherCAT and ETHERNET Powerlink," total of 174 pages.
ISO 15745-5, First Edition, Feb. 1, 2007, "Industrial automation systems and integration—Open systems application integration framework—Part 5: Reference description for HDLC-based control systems," total of 96 pages.

* cited by examiner

WIRELESS IO-LINK COMMUNICATION NETWORK HAVING AN ADDITIONAL MASTER AND METHOD FOR ITS OPERATION

CROSS REFERENCE TO RELATED APPLICATIONS

Applicant claims priority under 35 U.S.C. § 119 of German Application No. 10 2018 102 067.8 filed on Jan. 30, 2018, the disclosure of which is incorporated by reference.

BACKGROUND OF THE INVENTION

1. Field of the Invention

The present invention relates to a wireless IO-link communication network having an additional master (backup master) which is configured to control at least one device. In addition, the invention relates to a method for operating the wireless IO-link communication network, in which the backup master controls the at least one device instead of the main master in the event of restricted or failed function of a main master. The invention furthermore relates to a software programme which performs each step of the method when it runs on an electronic computer, as well as a storage medium on which the software programme is stored. Finally, the invention relates to an electronic computer which is set up to perform the method according to the invention.

2. Description of the Related Art

In mechanical engineering and plant engineering as well as in automation technology, numerous standardised fieldbus systems have proved effective as an alternative to parallel individual cabling. Here, a plurality of so-called fieldbus modules are attached to a central control means via a fieldbus. Terminal devices are in turn attached to the fieldbus modules. Typically, up to 8 terminal devices are connected to a fieldbus module.

So-called "IO-link" connections have also been used more recently for connecting the terminal devices to the fieldbus modules. Such an IO-link connection as well as a method and a control means for operating such a connection are indicated in DE 10 2012 009 494 A1. As described there, the fieldbus modules take on the role of an IO-link "master". For example, sensors, actuators, display equipment, operating equipment, including drives in machines, are considered to be terminal devices (called "device" in the following).

A consortium of relevant manufacturers has specified a standard for an intelligent sensor/actuator interface with the name of "IO-link", which is standardised as an international open standard with the standard IEC 61131-9. IO-link devices referred to are subsequently described via description files IODD, IO-Link Device Description. The IODD is intended to additionally become standardised as a specification language with the standard ISO 15745, as an open standard.

Such an IO-link connection provides a serial point-to-point connection for signal transmission between sensors and actuators and the IO plane of the respective machine. In principle, an IC-link connection transmits data between the IO-link master and an IO-link device attached as a "slave".

A wireless IO-link communication network is described, for example, in DE 20 2015 103 359 U1. The master and devices used there are capable of wireless communication and are thus referred to therein as IO-link wireless modules. In particular, radio connections can be used in this respect. In order to generate a radio connection between master and slave, the master sends a signal with a preamble, to which the respective slave, i.e. the device, adjusts.

In the event of failure of a master, for example due to a technical malfunction or in the event of an interruption of the radio connection, the devices connected to this master also fail and the IO-link communication network collapses very rapidly. In order to compensate for the failure of the master, a second IO-link communication network including an additional master and additional devices which are connected to this additional master is intended.

SUMMARY OF THE INVENTION

A wireless IO-link communication network (subsequently called "IOLW (IO-link wireless) communication network") comprises a main master and at least one device. The term "main master" serves only for differentiation, and this master corresponds to a conventional master in such an IOWL communication network. The main master is configured to control the at least one device. Both the main master and the at least one device each have at least one receiver and at least one transmitter for wireless communication between the main master and the at least one device. The communication is point-to-point communication between the main master and the at least one device and can take place, in particular, bi-directionally. The receiver and the transmitter can also be formed functionally or in construction as transceivers.

In order to compensate for a failure of the main master without providing an entire second IO-link communication network, the IOLW communication network according to the invention additionally comprises a backup master which is connected to the main master and to the at least one device and is configured to control the at least one device instead of the main master. The backup master can be formed in the same manner to the main master and can likewise have at least one receiver and at least one transmitter or at least one transceiver for wireless point-to-point communication between the backup master and the at least one device, in particular also bidirectional communication. The backup master offers the advantage that, in the event of restricted or failed function of the main master and/or in the event of restricted and/or failed function of a connection between the main master and at least one device, it takes over the function of the main master, controls the at least one device instead of the main master, and thus continues to operate the IOLW communication network.

The connection between the main master and the backup master can be achieved in many different ways. On the one hand, the connection can be achieved as a direct connection, and on the other hand via a control unit which is interposed between the main master and the backup master. The control unit can be, for example, a further IO-link master, a programmable logic controller (PLC) or a fieldbus. Preferred types of connection between the main master and the backup master or between the control unit and the main master or the backup master are described in the following. Different types of connection can also be used for the connection between the main master and the control unit and for the connection between the backup master and the control unit. Several different types of connection can also be used for the connection between the main master and the backup master and/or the control unit for additional security. The connections described can be one of the following types of connection:

an optical connection;

an electrical connection, in particular a wired connection; or a wireless connection, in particular a radio connection.

The backup master is advantageously operable in a hot standby mode when the IOLW communication network is being operated by the main master. In hot standby mode, the backup master is in a waiting mode, in which it can receive signals. If the function of the main master and/or the connection between the master and the at least one device of the wireless IO-link communication network is restricted or failed, the backup master thus receives signals which activate it and cause it to perform its functions as backup master for controlling the at least one device in the IOLW communication network instead of the main master.

The main master can have an energy store, which serves for bridging an energy undersupply, e.g. in the event of a power failure. It is thus guaranteed that the main master performs the transfer of the function to the backup master. On the one hand, the energy store can be integrated in the main master, and on the other hand it can be externally connected to the main master.

The backup master can also have an energy store which is formed to independently supply the backup master with the energy required for operation, in the event of energy undersupply, e.g. during a power failure. It is thus guaranteed that the backup master can also continue to be operated in the event of complete power failure. On the one hand the energy store can be integrated in the backup master, and on the other hand it can be externally connected to the backup master.

The main master and/or the backup master can optionally have an alarm interface and/or an alarm device. The state of the operating mode can be signalled via the alarm interface and/or the alarm device, in particular which master is currently active and is controlling the at least one device.

The invention furthermore relates to a method for operating a previously described wireless IO-link communication network in the event of restricted or failed function of the main master and/or in the event of restricted or failed function of the connection between the master and the at least one device of the IOLW-communication network. In this case, the backup master controls the at least one device instead of the main master. The restricted or failed function of the main master and/or the restricted and/or failed function of the connection between the master and the at least one device can thus be compensated for, and the IOLW-communication network continue to be operated.

The backup master is advantageously operated in a hot standby mode when the IOLW communication network is being operated by the main master. In hot standby mode, the backup master, as already described, is in a waiting mode in which it can receive signals. If the function of the main master and/or the connection between the master and the at least one device of the wireless IO-link communication network is restricted or failed, the backup master thus receives signals which activate it and cause it to perform its functions as backup master for controlling the at least one device in the IOLW communication network instead of the main master.

The signals can come directly from the main master and be transmitted via the connection between the main master and the backup master. The main master can send the backup master at least one command for controlling the at least one device, the backup master being activated and prompted to control the at least one device via said command. In other words, the main master commands the backup master to take over the function of the main master in the IOLW communication network. This is especially advantageous in the event of (planned) maintenance of the main master.

Alternatively, the backup master can itself conclude the restricted or failed function of the main master via the signals received. Here, the signals can be sent from the main master to the backup master via the previously described connection, or the backup master receives the signals directly from the wireless communication between the main master and the at least one device. More generally, signals which are intended to be sent from the main master but are not actually sent, i.e. also not received by the backup master, are also included herein. Signals which are sent at regular intervals, timed signals, continuous signals or other signals whose sending intention is known to the backup master, are especially suitable for this. The backup master can conclude a restricted or failed function of the main master from the absence of such signals despite the fact that the main master should send these signals. If the restricted or failed function of the main master is established, the backup master can be automatically activated and control the at least one device instead of the main master. Likewise, the backup master can be automatically activated when a restricted or failed function of the connection between the main master and the at least one device is established. This is especially advantageous in the event of an unexpected failure of the main master. Consequently, the backup master takes on the function of the main master without outside intervention, hence, in particular, without a user having to independently cause this.

Furthermore, the backup master can be synchronised with the main master with respect to the above-mentioned connections between the backup master and the main master and use the same connection data as the main master. The reception security of the signals sent from the main master to the backup master via these connections is thus increased.

Advantageously, the restricted or failed function of the connection between the main master and the at least one device is established as follows: The main master sends data to the at least one device in the usual manner. If the connection is fully functional, the device sends an acknowledgement back to the main master via the bidirectional connection of the data sent from the main master. If, however, the main master does not receive any acknowledgement of the data sent from it from the at least one device, a restricted or failed function of the connection between the main master and the at least one device can be concluded. As soon as a restricted or failed function of the connection between the main master and the at least one device has been established, the main master can transmit the data sent from it to the backup master, which can then send this data to the at least one device. The previously described connection between the main master and the backup master (and optionally the control unit) can be used for this purpose.

Preferably, a plurality of backup masters connected to the main master and the at least one device are provided for the same IOWL communication network. The backup master which controls the at least one device can be selected from the plurality of backup masters. For this purpose, the main master can detect the quality of the connection of several of the plurality of backup masters. Advantageously, the one whose connection to the at least one device has the best quality is selected as backup master. This property can also be used for so-called "load sharing" between the masters. It can furthermore be provided that the quality of the connection is detected separately for each radio channel of the connection. A master typically operates, e.g., eight radio channels which are each mapped over one or more consecutive timeslots. Here, also, missing acknowledgements of the data sent from the respective backup master to the at least one device can be used in order to judge the quality of the connection. As a result, the backup master which is best suited for the control of the at least one device with respect to the current connection quality is always selected from the plurality of backup masters.

It can be provided that predefined and/or situational commands and/or information are sent to the at least one device when another of the plurality of backup masters than the backup master that controls the at least one device is selected as the backup master. Examples of such predefined and/or situational commands and/or information are a controlled shutdown of the at least one device or the IOLW communication network by an actuator, or a display, for example, of the operating state on a display which is attached in the IOLW communication network, in particular which backup master is currently controlling the at least one device.

It can be additionally provided that operating parameters and/or operating tasks of the at least one device are dependent on the backup master which is controlling the at least one device. Different operating parameters and/or operating tasks can be explicitly assigned to the at least one device, depending on the current backup master which is controlling the at least one device, and these can be changed when another of the plurality of backup masters is selected than the backup master which is controlling the at least one device. Examples of the operating parameters and/or the operating tasks are different "blacklists" for different backup masters or the tasks performed by actuators.

According to an aspect, it can be provided that the main master and the backup master control the at least one device in an alternating manner. Here, also, the backup master best suited to controlling the device can be selected as described above. As a result, the diversity of the communication to at least one device can be increased and thus the reliability of the IOLW communication network can be increased.

It can be provided that the operating mode of the wireless IO-link communication network is detected and stored (logging). Errors, and thus also the restricted or failed functions of the main master and/or the restricted or failed functions of the connection between main master and the at least one device, can thus be traced back.

The software programme is set up to carry out each step of the method, in particular when it is carried out on an electronic computer. It is stored on the storage medium for implementation.

By uploading the software programme on an electronic computer, which is, in particular, part of the backup master or of the control unit, it is set up to control the IOLW communication.

BRIEF DESCRIPTION OF THE DRAWINGS

Other objects and features of the invention will become apparent from the following detailed description considered in connection with the accompanying drawings. It is to be understood, however, that the drawings are designed as an illustration only and not as a definition of the limits of the invention.

In the drawings.

DETAILED DESCRIPTION OF PREFERRED EMBODIMENTS

Figure 1:
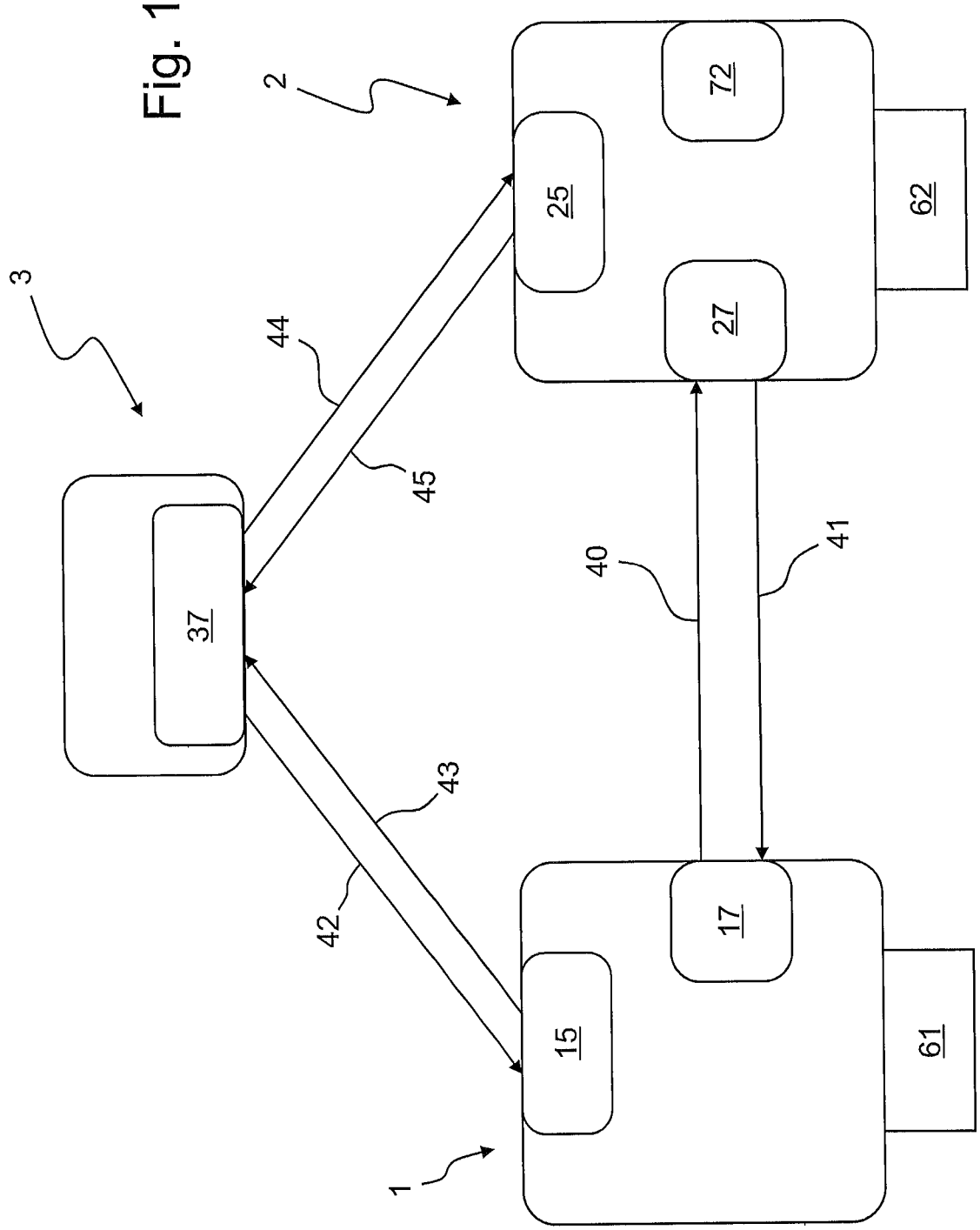
FIG. 1 shows a schematic depiction of a first embodiment of the IOLW communication network according to the invention, having a backup master.

FIG. 1 schematically shows the structure of a first embodiment of the wireless IO-link (IOLW) communication network according to the invention, which comprises a main master 1, a backup master 2 and at least one device 3. Typically, the IOLW communication network comprises several devices, which have been reduced to one device 3 here for simplicity. The main master 1 has a transceiver 15 for sending data to the device 3 via the connection 43 and for receiving data from the device 3 via the connection 42. Similarly, the backup master 2 likewise has a transceiver 25 for sending data to the device 3 via the connection 45 and for receiving data from the device 3 via the connection 44. The device 3 in turn has a transceiver 37 for receiving data both from the main master 1 via the connection 43 and from the backup master 2 via the connection 45 and for sending data both to the main master 1 via the connection 42 and from the backup master 2 via the connection 44. The connections 42, 43 and 44, 45 between the device 3 and the main master 1 or the backup master 2, respectively, constitute point-to-point radio connections for a bidirectional communication.

The main master 1 furthermore has a further communication unit 17 and the backup master 2 has a further communication unit 27 which are formed to set up bidirectional communication between the main master 1 and the backup master 2 via the direct connections 40, 41. The connections 40 can have one of the following types of connection, wherein the communication units 17, 27 support the respective type of connection:

an optical connection;
an electrical connection, in particular a wired connection; or
a wireless connection, in particular a radio connection.

The backup master 2 is synchronised with the main master 1 via the connections 40, 41 and uses the same connection data as the main master. This leads to a higher reception security of signals which are sent from the main master 1 to the backup master 2 via these connections 40, 41.

With reduced or failed function of the main master 1 and/or with reduced or failed function of the connections 42, 43 between the main master 1 and the device 3, the backup master 2 takes on the function of the main master 1 and controls the device 3 instead of the main master 1, whereby the IOLW communication network can continue to be operated. The event that the main master 1 and/or the connections 42, 43 between the main master 1 and the device 3 have failed is subsequently described. The description can be transferred without further ado to the restricted function of the main master 1 and/or the connections 42, 43.

When the IOLW communication network is being operated by the main master 1, the backup master 2 is in a hot standby mode. In the hot standby mode, the backup master 1 is in a waiting mode in which it can receive signals from the main master 1 via the connection 40 or can listen in on the communication between the main master 1 and the device 3 via the connection 43.

The main master 1 can send a command to the backup master 2 via the connection 40, which prompts the backup master 2 to take on the function of the main master 1 in the IOLW communication network. The backup master 2 is activated by the command and is prompted to control the at least one device 3 instead of the main master 1. Such a command is issued, e.g., in the event of planned maintenance of the main master 1.

In addition, the backup master 2 can itself conclude the failed function of the main master, via received signals of the main master 1, which are either sent directly via the connection 40 or which the backup master 2 listens in on from the connection 43 to the device. The backup master 2 can also conclude the failed function of the main master 1 from an absence of signals which the main master 1 sends, for example, at regular intervals, during normal function. If the restricted or failed function of the main master 1 is ascertained, the backup master 2 can be automatically activated and can control the device 3 instead of the main master 1. An unexpected failure of the main master 1 can thus be compensated for, without outside intervention, and without a user having to cause this independently.

A failed function of the connection 42, 43 between the main master 1 and the device 3 can be established via an acknowledgement from the device 3 of the data sent from the main master. The main master 1 sends data to the device 3 via the connection 43. The device 3 subsequently sends the acknowledgement of the sent data back to the main master 1 via the connection 42. However, if the main master 1 does not receive such an acknowledgement of the data sent from it from the device 3, a failed function of at least one of the connections 42, 43 between the main master 1 and the device 3 is concluded. As soon as the failed function of at least one of the connections 42, 43 is concluded, the main master 1 sends the data sent from it via the connection 40 to the backup master 2, which then sends this data to the device 3 via the connection 45.

Figure 2:
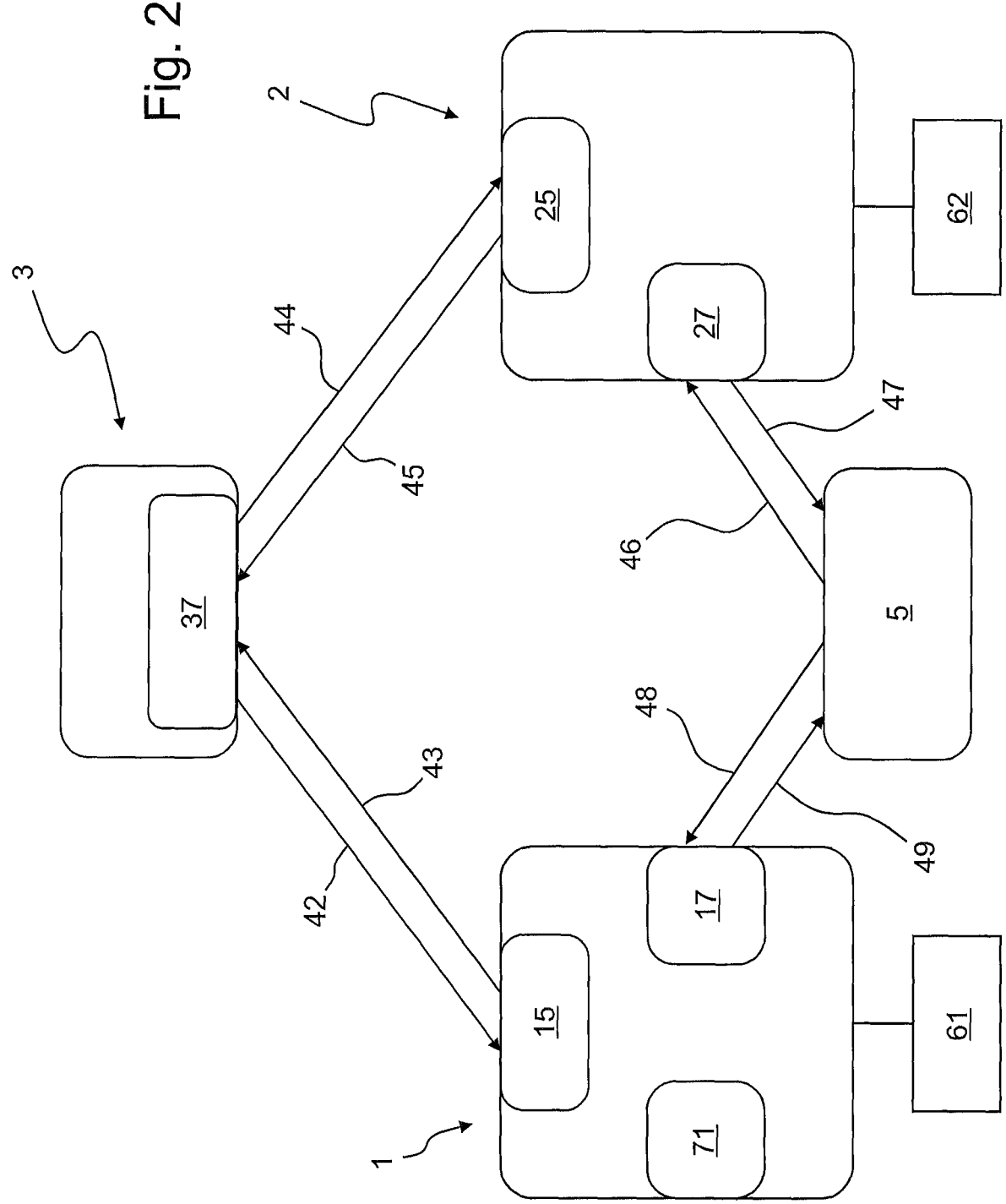
FIG. 2 shows a schematic depiction of a second embodiment of the IOLW communication network according to the invention, having a backup master and a control unit.

FIG. 2 schematically shows the structure of a second embodiment of the wireless IO-link communication network according to the invention, which has a control unit 5, e.g. a further IO-link master, a programmable logic controller (PLC) or a fieldbus. The control unit 5 is connected to the communication unit 17 of the main master 1 via connections 48, 49 and is connected to the communication unit 27 of the backup master 2 via connections 46, 47. Consequently, the communication between the main master 1 and the backup master 2 takes place via the control unit 5. The connections 46, 47 and 48, 49 can be one of the following types of connection which have already been shown, wherein the communication units 17, 27 support the respective type of connection:

an optical connection;
an electronic connection, in particular a wired connection; or
a wireless connection, in particular a radio connection.

Here, too, the backup master 2 is synchronised with the main master 1 and uses the same connection data.

Identical components and connections are labelled with the same reference numbers. The further components, connections and functions correspond to those which have already been described in connection with FIG. 1. Reference is thus made to the description of the first embodiment.

If the backup master 2 controls the device 3 instead of the main master 1, it thus communicates this to the control unit 5. The control unit 5 can then deactivate the main master 1.

Furthermore, the control unit 5 can cause the main master 1 and the backup master 2 to control the device 3 in an alternating manner.

The operating mode of the wireless IO-link communication network is detected and stored (logging). Errors, thus the restricted or failed functions of the main master 1 and/or the restricted or failed functions of the connections 42, 43 between the main master and the at last one device, can be traced.

The main master 1 has an energy store 61 which serves for bridging, e.g. in the event of a power failure, wherein it is ensured that the main master 1 can perform the transfer of the function to the backup master 2. On the one hand, the energy store 61 can be integrated in the main master 61, as shown in FIG. 1, or on the other hand, as shown in FIG. 2, it can be externally connected to the main master 1. The backup master 2 also has an energy store 62, which supplies the backup master 2 with the energy required for operation independently of other energy sources, e.g. in the event of a power failure, wherein it is ensured that the backup master 2 can also continue to be operated in the event of a complete power failure. On the one hand, as shown in FIG. 1, the energy store 62 can be integrated in the backup master 2 or on the other hand, as shown in FIG. 2, it can be externally connected to the backup master. It should be noted here that external energy stores 61, 62, as shown in FIG. 2, can also be used in the first embodiment shown in FIG. 1, and, the other way around, in the second embodiment shown in FIG. 2, integrated energy stores 61, 62, as shown in FIG. 1, can also be used. Furthermore, the two external energy stores 61 and 62 can also be formed as a common energy store (not depicted).

In FIG. 1, the backup master 2 has an alarm device 72. In FIG. 2, the main master 1 has an alarm device 71. The state of the operating mode is signalled via the alarm devices 71, 72, above all which master 1, 2 is currently active and is controlling the device 3—independent of which master 1, 2 has the alarm device 71, 72. Instead of an alarm device 71,72, an alarm interface which is not depicted here can also be provided which performs the same function. Here, it should be noted that in the first embodiment shown in FIG. 1, the main master 1 can have the alarm device 71 or the alarm interface and, the other way around, in the second embodiment shown in FIG. 2, the backup master 2 can also have the alarm device 72 or the alarm interface.

Figure 3:
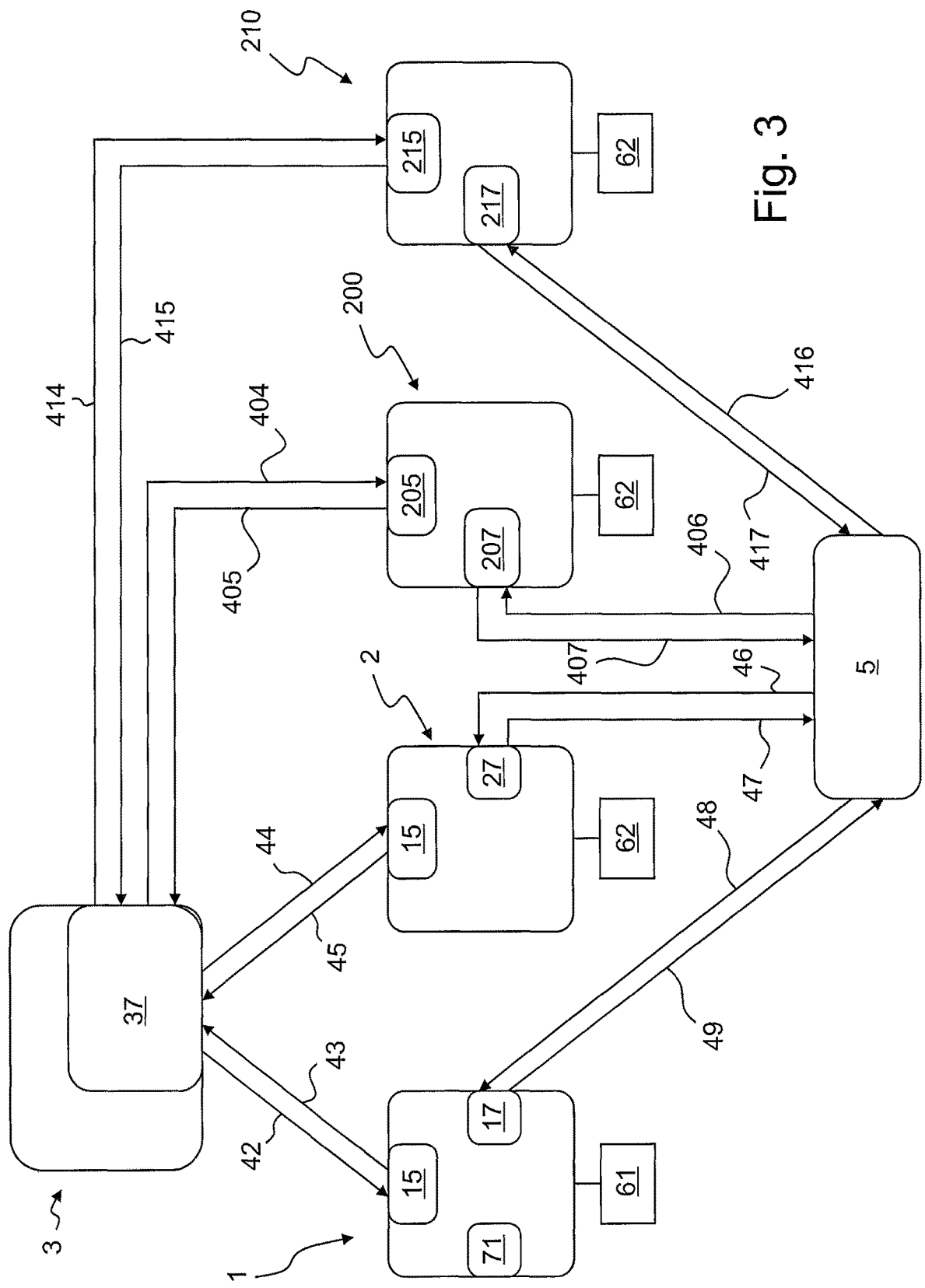
FIG. 3 shows a schematic depiction of a third embodiment of the IOLW communication network according to the invention, having a plurality of backup masters and a control unit.

FIG. 3 schematically shows the structure of a third embodiment of the wireless IO-link (IOLW) communication network according to the invention, which has a plurality of backup masters 2, 200, 210. The backup masters 2, 200, 210 are all structured in an identical manner and each have a transceiver 25, 205, 215 for communicating with the device 3 via the connections 44, 45 or 404, 405 or 414, 415, respectively, and a communication unit 27, 207, 217 for communicating with the control unit 5 via the connections 46, 47 or 406, 406 or 416, 417, respectively. Identical components and connections are labelled with the same reference numbers. The further components, connections and functions correspond to those which have already been described in the second embodiment in connection with FIG. 2. Reference is thus made in this context to the description of the second embodiment.

After the failed function of the main master 1 or of the connections 42, 43 has been established, a backup master 2 (in this exemplary embodiment analogously to the second embodiment) is selected from the plurality of backup masters 2, 200, 210, which controls the device 3. The selection is made by the main master 1 on the basis of the quality of the connections 44, 45 or 404, 405 or 414, 415 to the device 3. For controlling the device 3, the one of the backup masters 2 is selected whose connection 44, 45 to the device 3 has the best quality. This property can also be used for so-called "load sharing" between the masters 1, 2, 200, 210. Each master 1, 2, 200, 210 operates several radio channels, typically eight, which are mapped over one or more consecutive time slot(s) (not shown in more detail here). The quality of the connections 44, 45 or 404, 405 or 414, 415 is detected separately for each of these radio channels of the connection. As already described, here, missing acknowledgements of the data sent from the respective backup master 2 to the at least one device 3 are also used to judge the quality of the connections 44, 45 or 404, 405 or 414, 415. The backup master 2 which is most suitable for controlling the device 3 with respect to the current connection quality is then selected.

When another backup master 200 of the plurality of backup masters 2, 200, 210 is selected for controlling the device 3, predefined and/or situational commands, such as, for example, a shutdown of the device 3, and/or information, such as, for example, which backup master 200 is currently controlling the device 3, are sent to the device 3. If the device 3 is a display, the information can be depicted on it.

Operating parameters and/or operating tasks of the device 3 are additionally dependent on the backup master 2, 200, 210, which is controlling the device. Different operating parameters and/or operating tasks are then assigned to the device 3 independently of the current backup master 2 which is controlling the device 3, and these are then changed when a different backup master 200 is controlling the device. Examples of the operating parameters and/or the operating tasks are different "blacklists" for different backup masters 2, 200, 210, or tasks performed by the device 3.

Although only a few embodiments of the present invention have been shown and described, it is to be understood that many changes and modifications may be made thereunto without departing from the spirit and scope of the invention.

What is claimed is:

1. A wireless IO-link communication network, comprising:
    a main master,
    at least one device,
    a bidirectional wireless communication between the main master and the at least one device over the wireless IO-link network, and
    at least one backup master which is connected to the main master and the at least one device and is configured to control the at least one device,
    wherein the connection between the main master and the backup master is achieved via a control unit and the backup master is synchronized with the main master,
    the main master is configured to controls the at least one device, and to communicate this to the control unit while the backup master is in the hot standby mode, wherein a hot standby mode is a mode in which the backup master is configured to listen to signals of the main master communicated to the at least one device;
    when the main master fails or is restricted in function, the backup master is configured to controls the at least one device and is configured to communicate this to the control unit;
    the control unit is configured to deactivate the main master in response to the backup master communicating that the backup master controls the at least one device, and
    wherein the control unit is configured to control the main master and the backup master such that the main master and the backup master control the at least one device alternately.

2. The wireless IO-link communication network according to claim 1, wherein the connection between the main master and the backup master is an optical connection.

3. The wireless IO-link communication network according to claim 1, wherein the connection between the main master and the backup master is an electrical connection.

4. The wireless IO-link communication network according to claim 1, wherein the connection between the main master and the backup master is a wireless connection.

5. The wireless IO-link communication network according to claim 1, wherein the main master and/or the backup master have an energy store.

6. The wireless IO-link communication network according to claim 1, wherein the main master and/or the backup master have an alarm interface and/or an alarm device.

7. A method for operating a wireless IO-link communication network comprising a main master, at least one device, a bidirectional wireless communication between the main master and the at least one device, over the wireless IO-link network, and at least one backup master which is connected to the main master and the at least one device and is configured to control the at least one device, the method comprising:
    controlling the at least one device with the backup master instead of the main master upon restricted or failed function of the main master and/or of a connection between the main master and at least one device of the wireless IO-link communication network, wherein the connection between the-main master and the backup master is achieved via a control unit and the backup master is synchronized with the main master, wherein the main master controls the at least one device and communicates this to the control unit while the backup master is in a hot standby more, the hot standby mode being a mode in which the back master listens to signals of the main master communicated to the at least one device, and wherein when the main master fail or is restricted in function, the backup master controls the at least one device and communicates this to the control unit; and
    deactivating, b the control unit the main master in response to the backup master communicating that the backup master controls the at least one device, and controlling, by the control unit, the main master and the backup master such that the main master and the backup master control the at least one device alternately.

8. The method according to claim 7, wherein the main master sends at least one command to the backup master for driving the at least one device.

9. The method according to claim 7, wherein the backup master and uses the same connection data as the main master.

10. The method according to claim 7, wherein the restricted or failed function of the connection between the main master and the at least one device is established when the main master does not receive an acknowledgement of data sent from the main master to the at least one device.

11. The method according to claim 7, wherein data sent from the main master is transmitted to the backup master which then sends the data to the at least one device as soon as a restricted or failed function of the connection between the main master and the at least one device has been established.

12. The method according to claim 7, wherein the backup master that controls the at least one device is selected from a plurality of backup masters connected to the main master and the at least one device.

13. The method according to claim 12, wherein the main master detects the quality of the connection of several of the plurality of backup masters, wherein the backup master whose connection to the at least one device has the best quality is selected as the backup master which controls the at least one device.

14. The method according to claim 13, wherein the quality of the connection is detected separately for each radio channel of the connection.

15. The method according to claim 7, wherein operating parameters and/or operating tasks of the at least one device are dependent on the backup master which controls the at least one device.

16. The method according to claim 7, wherein an operating mode of the wireless IO-link communication network is detected and stored.

17. A non-transitory computer-readable storage medium that stores a computer program comprising a set of computer readable instructions, which, when executed by the computer, carry out all the steps of the method according to claim 7.

18. An electronic computer which is set up to control the wireless IO-link communication network by means of the method according to claim 7.

19. The wireless IO-link communication network according to claim 1, wherein the control unit comprises a PLC or a fieldbus.

20. The method according to claim 7, wherein the control unit comprises a PLC or a fieldbus.

* * * * *